United States Patent [19]
Gordon et al.

[11] Patent Number: 4,956,571
[45] Date of Patent: Sep. 11, 1990

[54] SUPERCONDUCTING MAGNETIC BEARING

[75] Inventors: Keith M. Gordon, Munsonville; Robert A. Hanson, Peterborough, both of N.H.

[73] Assignee: MPB Corporation, Keene, N.H.

[21] Appl. No.: 317,440

[22] Filed: Mar. 1, 1989

[51] Int. Cl.[5] .............................................. F16C 39/06
[52] U.S. Cl. .................................... 310/90.5; 310/10; 310/52; 310/156; 505/700
[58] Field of Search ................ 310/90.5, 10, 52, 40 R, 310/156; 505/1, 700; 335/216, 229

[56] References Cited

U.S. PATENT DOCUMENTS

| | | | |
|---|---|---|---|
| 3,026,151 | 3/1962 | Buchhold | 310/90.5 |
| 3,175,405 | 3/1965 | Doyle | 310/90.5 |
| 3,243,238 | 3/1966 | Lyman | 310/90.5 |
| 3,261,210 | 7/1966 | Buchold | 310/90.5 |
| 3,356,425 | 12/1967 | Carriere et al. | 310/90.5 |
| 3,378,315 | 4/1968 | Webb | 310/90.5 |
| 3,428,371 | 2/1969 | Lyman | 310/90.5 |
| 3,614,181 | 10/1971 | Meeks et al. | 310/90.5 |
| 3,741,613 | 6/1973 | Pfaler | 310/90.5 |
| 3,820,859 | 6/1974 | Brown | 310/90.5 |
| 3,958,842 | 5/1976 | Telle | 310/90.5 |
| 4,068,533 | 1/1978 | Ferriss | 74/5.6 |
| 4,285,248 | 8/1981 | Noar et al. | 74/5 |
| 4,320,927 | 3/1982 | Sertich | 310/90.5 |
| 4,379,598 | 4/1983 | Goldowsky | 310/90.5 |
| 4,500,142 | 2/1985 | Brunet | 310/90.5 |
| 4,527,802 | 7/1985 | Wilcock et al. | 277/1 |
| 4,545,209 | 10/1985 | Young | 310/90.5 |
| 4,629,261 | 12/1986 | Eiermann et al. | 310/90 |

FOREIGN PATENT DOCUMENTS

| | | |
|---|---|---|
| 1283946 | 11/1968 | Fed. Rep. of Germany ..... 310/90.5 |
| 2421853 | 11/1975 | Fed. Rep. of Germany . |
| 2367939 | 10/1975 | France . |

OTHER PUBLICATIONS

Wolsky, Alan M. et al., "*The New Superconductors: Prospects for Applications*", Scientific American, Feb. 1989, pp. 60–69.

*Primary Examiner*—R. Skudy
*Attorney, Agent, or Firm*—Fish & Richardson

[57] ABSTRACT

A superconducting magnetic bearing assembly has an outer element having an axis. Disposed about the axis, the outer element has first and second inverted generally conical surfaces, each surface disposed at an acute angle to the axis. These surfaces define a volume. Fixedly disposed within the volume is an inner element rotatable relative to the outer element. The inner element has first and second conical inner elements. The first conical inner element has a first surface opposed to and spaced from said first generally conical surface of the outer element, the opposed first surfaces lying generally parallel to each other. The second conical inner element has a second surface opposed to and spaced from the second generally conical surface of the outer element, the opposed second surfaces lying generally parallel to each other. A spacer is disposed between first and second conical inner elements for adjusting the axial spacing between the surfaces of the conical inner elements, thereby to adjust the dimension of the space between the opposed surfaces. A first element is of superconductive material and a second element is of a material that can generate a magnetic field about the second element. The superconductive first element expels the magnetic field to maintain the spaced apart relationship of the opposed surfaces under load.

5 Claims, 1 Drawing Sheet

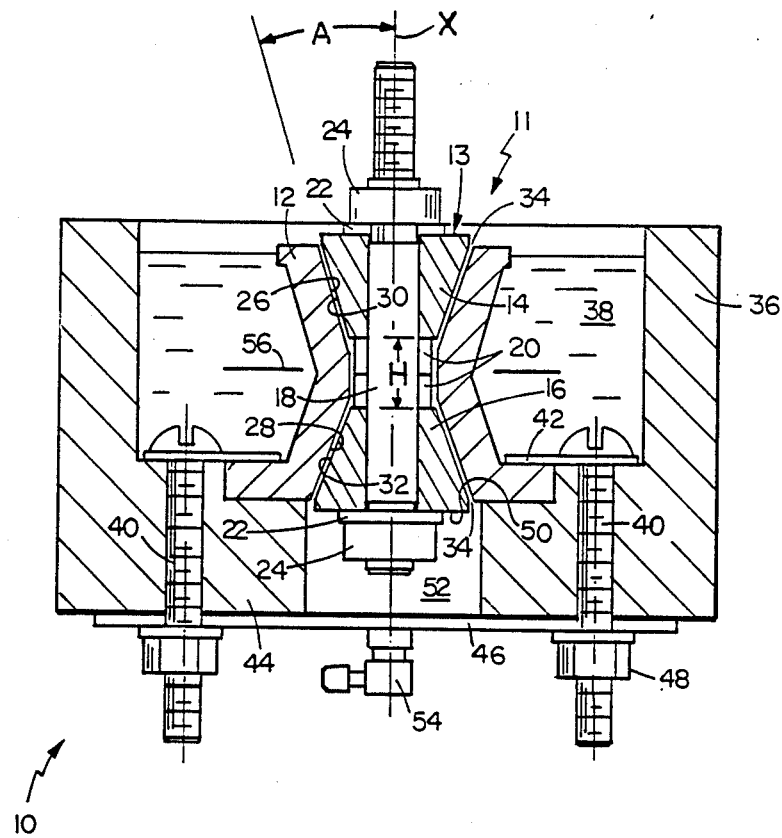

SUPERCONDUCTING MAGNETIC BEARING

The invention relates to support shaft magnetic bearings of the type consisting of an inner body attached to a rotating part and an outer body with surfaces opposed to surfaces of the inner body. The inner body and/or the outer body are formed of magnetic material, and the opposed surfaces are spaced from each other by means of the coacting repulsive forces between bodies in order to provide a gap, thereby allowing the part to rotate freely without friction or wear. Goldowsky U.S. Pat. No. 4,329,598 describes a bearing system employing opposed permanent magnets spaced apart by action of repulsive magnetic forces.

SUMMARY OF THE INVENTION

According to the invention, superconducting magnetic bearing assembly comprises an outer element of having an axis and, disposed about the axis, the outer element having first and second inverted generally conical surfaces, each surface disposed at an acute angle to the axis, the surfaces defining a volume. Fixedly disposed within the volume is an inner element rotatable relative to the outer element, the inner element comprising first and second conical inner elements. The first conical inner element has a first surface opposed to and spaced from the first generally conical surface of the outer element, these opposed first surfaces lying generally parallel to each other. The second conical inner element has a second surface opposed to and spaced from the second generally conical surface of the outer element, these opposed second surfaces lying generally parallel to each other. Spacer means are disposed between the first and second conical inner elements for adjusting the axial spacing between the surfaces of the conical inner elements, thereby to adjust the dimension of the space between the opposed first surfaces and opposed second surfaces. A first element comprises superconductive material and a second element comprises a material adapted to generate a magnetic field. Means are provided for forming a magnetic field about the second element, and the superconductive first element is adapted to expel the magnetic field in a manner to maintain the spaced apart relationship of the first opposed surfaces and second opposed surfaces under load.

In preferred embodiments, the first element of superconductive material comprises the outer element; the second element comprises a permanent magnet; the superconducting magnetic bearing assembly further comprises means for maintaining the outer element in a supercooled environment, and comprises means for delivering a flow of fluid through the space between the opposed surfaces.

These and other features and advantages of the invention will be apparent from the following description of a presently preferred embodiment, and from the claims.

DESCRIPTION OF THE PREFERRED EMBODIMENT

The drawing is first briefly described.

The Figure shows a superconducting magnetic bearing of the invention.

STRUCTURE

Superconducting magnetic bearing assembly 10 consists of a magnet assembly 11 including an integrally-formed, outer body 12 of double-inverted, conical configuration, made of a superconductive material, e.g., a superconductive ceramic of $YBa_2Cu_3O_7$ (Yttrium-Barium-Copper-Oxide), e.g., as supplied by HiT$_c$ Superconco, Inc. of Lambertville, N.J. The outer body 12 is disposed coaxially about an inner body 13 consisting of upper and lower inner conical elements or cones 14, 16, also disposed in inverted arrangement, of magnetic material, e.g. Neodymium Iron, magnetized axially. The inner conical elements are disposed coaxially about a rotating part, e.g. shaft 18 of 303 stainless steel, spaced axially apart by shims 20, formed, e.g., of 440C stainless steel, and held in position on shaft 18 by washers 22 and threaded nuts 24.

The inner surfaces 26, 28 of the outer body are disposed at angle A, e.g., 17° 30', to the axis, X. The respective opposed surfaces 30, 32 of the inner conical elements lie parallel to surfaces 26, 28, and are disposed at the same angle A. In operation, the inner elements form magnetic fields. The superconductive material of the outer element, at a temperature below its transition point, abruptly expels the magnetic field, due to the Meissner effect. The opposed surfaces 26, 30 and 28, 32 are thereby spaced apart by a gap 34 by coaction of the inner and outer bodies, the inverted double conical angled surfaces of the outer body 12 serving to trap the inner body 13 and its attached shaft 18. The width of the gap 34 is determined by the combined height, H, of shims 20.

The bearing assembly 10 in the embodiment shown for rotation about a vertical axis further consists of a container 36 of insulative material, e.g. styrofoam, defining a reservoir 38. The magnetic assembly 11 positioned within the reservoir is affixed to the container by means of screws 40 extending through inner plate 42, bottom wall 44 of container 36, and outer plate 46, and secured by nuts 48. (The plates 42, 46 are formed, e.g., of aluminum and screws 40 are formed, e.g., of nylon.) Container 36 and outer plate 46 further define, with the base surface 50 of magnetic assembly 11, a cavity 52. Fitting 54 extends through plate 46 for conducting air or nitrogen gas into the cavity to pass through gap 34 to prevent frosting, as described below.

OPERATION

For operation of the superconducting magnetic bearing assembly 10 of the invention, a coolant selected for maintenance of the assembly 10 at the desired operating temperature below its transition point, e.g. liquid nitrogen, is delivered into the reservoir 38. A flow of gas, e.g. dry air or dry nitrogen, is delivered via fitting 54 into cavity 52 to flow through gap 34 between the opposed surfaces 26, 30 and 28, 32 of the inner and outer bodies to remove moisture and prevent frosting.

The coaction of the inner and outer bodies due to the Meissner effect suspends the shaft 18 and inner cones 14, 16 within the volume defined by the surfaces 26, 28 of the outer body 12, with the opposed surfaces spaced apart to form gap 34. (As mentioned above, the dimension of the gap is predetermined by selection of the height of the shims 20.) The angled arrangement of the opposed surfaces 26, 30 and 28, 32, with the convex necking (at 56) of the surfaces of the outer member 12 and between the surfaces of the inner cones serves to trap the rotating element.

By limiting the gap to a small dimension, e.g. of the order of about 0.015 inch in the construction shown, there is provided a stiff bearing assembly with the shaft supported under axial, radial and moment loads at all speeds, including stationary.

Other embodiments are with the following claims. For example, other angles A may be selected for applications requiring primary support against loads of a particular nature. Other constructions employing the concept of trapping a magnetic rotating part between two opposing superconducting surfaces to provide a bearing of high stiffness will be apparent from the example described herein.

What is claimed is:

1. A superconducting magnetic bearing assembly comprising an outer element having an axis and, disposed about said axis, said outer element having a first generally conical outer element surface and a second generally conical outer element surface, said first generally conical outer element surface being inverted relative to said second generally conical outer element surface, each said generally conical outer element surface being disposed at an acute angle to said axis, said generally conical outer element surfaces defining a volume, fixedly disposed within said volume, an inner element rotatable relative to said outer element, said inner element comprising a first conical inner element and a second conical inner element, said first conical inner element having a first inner element surface opposed to and spaced from said first generally conical outer element surface of said outer element, said first inner element surface lying generally parallel to the opposed said first generally conical outer element surface, and said second conical inner element having a second inner element surface opposed to and spaced from said second generally conical outer element surface of said outer element, said second inner element surface lying generally parallel to the opposed said second generally conical outer element surface, spacer means disposed between said first conical inner element and said second conical inner element for adjusting the axial spacing between the inner element surfaces of said conical inner elements, thereby to adjust the dimension of a space defined between the opposed first surfaces and the opposed second surfaces of said inner element and said outer element, a predetermined superconductive first element of one of said inner element and said outer element comprising superconductive material and a predetermined magnetic second element of another of said inner element and said outer element comprising a material adapted to generate a magnetic field, and means for forming a magnetic field about said predetermined magnetic second element, said predetermined superconductive first element adapted to expel said magnetic field in a manner to maintain the spaced apart relationship of the opposed first surfaces and the opposed second surfaces of said inner element and said outer element under load.

2. The superconducting magnetic bearing assembly of claim 1 wherein said predetermined superconductive first element comprises said outer element.

3. The superconducting magnetic bearing assembly of claim 1 wherein said predetermined magnetic second element comprises a permanent magnet.

4. The superconducting magnetic bearing of claim 1 further comprising means for maintaining said predetermined superconductive first element in a supercooled environment.

5. The superconducting magnetic bearing of claim 1 further comprising means for delivering a flow of fluid through said space defined between the opposed first surfaces and the opposed second surfaces of said inner element and said outer element.

* * * * *